United States Patent [19]
Kawamata et al.

[11] 3,954,641
[45] May 4, 1976

[54] PROCESS FOR THE PREPARATION OF SULFUR MODIFIED FERROMAGNETIC CHROMIUM OXIDE

[75] Inventors: Tadashi Kawamata, Settsu; Toshihiro Mihara, Hirakata; Yukio Terada, Osaka; Eiichi Hirota, Sakai, all of Japan

[73] Assignee: Matsushita Electric Industrial Co., Ltd., Japan

[22] Filed: Aug. 31, 1973

[21] Appl. No.: 393,467

Related U.S. Application Data

[63] Continuation of Ser. No. 181,581, Sept. 17, 1971, abandoned.

[30] Foreign Application Priority Data

Sept. 22, 1970 Japan.............................. 45-83150

[52] U.S. Cl. ............................................. 252/62.51
[51] Int. Cl.² ....................................... C01G 37/02
[58] Field of Search.................. 252/62.51; 423/607

[56] References Cited
UNITED STATES PATENTS

| | | |
|---|---|---|
| 2,923,683 | 2/1960 | Ingraham et al................. 252/62.51 |
| 2,923,684 | 2/1960 | Ingraham......................... 252/62.51 |
| 3,034,988 | 5/1962 | Ingraham et al................. 252/62.51 |
| 3,278,263 | 10/1966 | Cox............................. 252/62.51 X |
| 3,547,823 | 12/1970 | Mihara et al.................... 252/62.51 |
| 3,547,824 | 12/1970 | Mihara et al.................... 252/62.51 |
| 3,583,917 | 6/1971 | Mihara et al.................... 252/62.51 |
| 3,600,314 | 8/1971 | Haines........................... 252/62.51 |
| 3,640,871 | 2/1972 | Kawamata et al................. 252/62.51 |

*Primary Examiner*—Jack Cooper
*Attorney, Agent, or Firm*—Wenderoth, Lind & Ponack

[57] ABSTRACT

The present invention provides a ferromagnetic chromium oxide powder having an additive of sulfur incorporated therewith, which powder has a lower curie temperature than that of pure chromium dioxide powder and a high saturation magnetization. Said powder has a composition in weight percent, consisting essentially of 61.90 to 57.22 percent of chromium and 0.0038 to 15.10 percent of sulfur. Moreover, the ferromagnetic chromium oxide powder having a combination of sulfur and further additives selected from tellurium, tin and antimony has a lower Curie temperature than that of pure chromium dioxide together with a high intrinsic coercive force and a high saturation magnetization. The particles of these powders are in a uniform acicular shape and are useful in magnetic recording media, especially for slave tapes in thermomagnetic duplication.

4 Claims, No Drawings

PROCESS FOR THE PREPARATION OF SULFUR MODIFIED FERROMAGNETIC CHROMIUM OXIDE

This is a continuation of application Ser. No. 181,581, filed Sept. 17, 1971 now abandoned.

This invention relates to magnetic oxide powder for use in a magnetic recording tape. More particularly the invention relates to the ferromagnetic chrominum oxide powder having a low Curie temperature, high coercive force and high saturation magnetization. Such powder is suitable for magnetic tapes, discs and drums in high density recording.

Recently, the duplication of magnetic tapes became important. Various techniques for duplication have been studied with a view towards obtaining a clear copy with high fidelity from a master tape. One of the techniques is a thermomagnetic duplication, which is carried out by contacting both magnetic surfaces of a slave tape and a master tape and thereafter heating the contacted surfaces at a higher temperature than the Curie temperature of magnetic powders in the slave tape and cooling the contacted surfaces to room temperature. With this heat-treatment, a signal originally recorded on the magnetic surface of the master tape is duplicated on the magnetic surface of the slave tape. In the thermo-magnetic duplication, the magnetic powder of the slave tape must have a lower Curie temperature than that of the master tape. It is also desirable that the Curie temperature of the magnetic powder be as low as possible to avoid thermal-deformation of tapes during the duplicating heat-treatment. From this point of view, the magnetic powder of a slave tape must have a Curie temperature of about 100°C in addition to the usual requirement of a high coercive force and a high saturation magnetization.

The ferromagnetic chrominum dioxide powder has a Curie temperature of 116°C and a high saturation magnetization of 102 emu/g at room temperature. However, the pure chrominum dioxide powder has a low coercive force ranging between 30 Oe and 80 Oe.

Various modified chromium oxide powders having a low Curie temperature have been described in prior patents. U.S. Pat. No. 3,034,988 discloses that vanadium or manganese modified chromium oxide have a Curie temperature as low as 80°C. U.S. Pat. No. 3,068,176 discloses that the presence of fluorine in the crystal lattice of chromium dioxide lowers the Curie temperature and that the fluorine modified chromium oxides have a Curie temperature ranging from about 80° to about 140°C.

There are many additives which increase the coercive force of chromium oxide. Such additives have been described in the following prior patents: U.S. Pat. Nos. 3,547,823, 3,243,260, 2,923,685, 2,923,684, 2,923,683, 2,885,365. Generally, however, additives lowering the Curie temperature have a tendency to lower coercive force and saturation magnetization. Therefore, it is difficult to obtain a chromium oxide having a low Curie temperature together with a high coercive force and saturation magnetization, even when chromium oxide is modified by a combination of additives, i.e., a combination of an additive which lowers the Curie temperature and one which increases the coercive force.

An object of the present invention is to provide a novel additive which lowers the Curie temperature of ferromagnetic chromium oxide.

Another object of the invention is to provide a ferromagnetic chromium oxide powder having a lowered Curie temperature together with a high coercive force and a high saturation magnetization.

A further object of the present invention is to provide a magnetic powder suitable for use in a duplicating magnetic tape.

These and other objects of the invention will be apparent upon consideration of the following detailed description. The ferromagnetic chromium oxide produced according to the present invention has the additive sulfur incorporated therewith.

It has been discovered according to the present invention that the ferromagnetic chromium oxide powder having the additive sulfur incorporated therewith has a lower Curie temperature than that of pure chromium dioxide. An important feature is that the added sulfur lowers the Curie temperature without a large decrease in coercive force and saturation magnetization.

A high amount of sulfur additive impairs the saturation magnetization of the resultant chromium oxide. The chromium oxide of the present invention is obtained by addition of sulfur in an amount of not more than 15.10 weight percent in total. The weight percent referred to herein is based on a sum of the weights of chromium, oxygen and the additives, and should be 100 weight percent when the weight percent of chromium, oxygen and additives are added up.

According to the present invention, the effect of lowering the Curie temperature is exhibited by an addition of sulfur in an amount not less than 0.0038 weight percent. Particularly, the chromium oxide powder consisting essentially, in weight percent, of 58.81 to 61.88 percent of chromium and 0.05 to 10.00 percent of sulfur has a lower Curie temperature than that of pure chromium dioxide and a saturation magnetization at room temperature of at least 60 emu/g. More particularly, the chromium oxide powder consisting essentially, in weight percent, of 60.36 to 61.88 percent of chromium, 0.1 to 5.0 percent of sulfur, has a Curie temperature lowered at least by 5°C when compared with pure chromium dioxide and saturation magnetization of at least 70 emu/g.

The saturation magnetization ($\sigma_s$) and the Curie temperature (Tc) are measured by a magnetic balance, which was described in the publication by Hirone et al. (Sci. Rep. RITU, 6A, page 67, 1954). The coercive force (Hc) is derived from a hysteresis loop of the chromium oxide powder measured by using a Cioffi type B-H tracer at the maximum field of 3,000 Oe and at room temperature.

Ferromagnetic chromium oxide powder having an aforesaid additive incorporated therewith can be prepared by intimately mixing chromium trioxide, sulfur or any available and suitable compounds of sulfur so as to have the desired weight percent of sulfur and heating the mixture at a temperatue of 250° to 480°C in an autoclave producing a high pressure as set forth hereinafter.

Advantageous additive forms of sulfur are S, $TeS_2$, $Sb_2S_3$, $SnS_2$, $RuS_2$, MNS, CuS, $SeS_2$, $P_2S_5$, $Na_2S$, $K_2S$, CuS, ZnS and PbS. In accordance with this invention among these forms, the following are more desirable, e.g., S, $TeS_2$, $Sb_2S_3$, $SnS_2$.

Said mixture can be made in the usual manner, for example, as described in U.S. Pat. No. 3,547,823. The mixture with or without a small amount of water is put into a crucible. According to the present invention, such crucible is made of a material selected from the group consisting of glass, ceramics and durable metals other than iron.

Said mixture in the crucible is placed in an autoclave which is made of a corrosion resistant metal such as stainless steel and which is provided with a thermocouple for measuring the reaction temperature and with a pressure gauge. Care should be taken that the amount of mixture placed in the autoclave is controlled with respect to the inner volume of the autoclave so that a pressure in the autoclave due to the oxygen liberated from chromium trioxide or introduced initially into the autoclave and water vapour is in the range of 50 to 1,000 atmospheres at the desired reaction temperature.

The autoclave having the mixture therein can be heated by any suitable method, such as by an electric heater, while the temperature of the mixture is being measured. After reaching the reaction temperature, the mixture is maintained at the temperature for a suitable time period which depends on the pressure and the reaction temperature and is then cooled to room temperature in the autoclave. After being cooled, the mixture is removed from the autoclave, washed with water and dried by any suitable method.

In accordance with the present invention, it has been discovered that the ferromagnetic sulfur modified chromium oxide having a low Curie temperature can have an increased coercive force with further additives selected from the group consisting of tellurium, tin and antimony. Said further additions are carried out by mixing intimately chromium trioxide, sulfur or sulfur compounds and said further additives in metal or in compound form. Advantageous compounds of tellurium, tin and antimony are $TeO_2$, $H_6TeO_6$, $TeO_3$, $H_2TeO_4$, $Na_2TeO_4$, $K_2TeO_4$, $TeCl_4$, $SnO_2$, $H_2SnO_3$, $SnSo_4$, $Sn(COO)_2$, $Sn(C_2H_3O_2)_2$, $SnCl_2$, $SnBr_2$, $SnI_2$, $SnF_2$, $SnCl_3$, $Sb_2O_3$, $Sb_2(SO_4)_3$. The preferable compounds are $TeO_2$, $H_6TeO_6$, $TeO_3$, $H_2SnO_3$, $SnO_2$, $Sb_2O_3$. Said mixtures are processed by aforesaid processes.

According to the present invention the chromium oxide powder consisting essentially, in weight percent, of 61.88 to 50.91 percent of chromium, 0.05 to 10 percent of sulfur and 0.01 to 10 percent of further additives selected from tellurium, tin and antimony, has a lower Curie temperature than that of pure chromium dioxide together with a high coercive force and high saturation magnetization.

Ferromagnetic chromium oxide powder consisting essentially of
61.84 to 53.08 weight percent of chromium
0.05 to 5.00 weight percent of sulfur and
0.10 to 10.00 weight percent of tellurium,
can be prepared according to the present invention.

Chromium oxide powders having a suitable combination of additives have a Curie temperature of 100°C together with a coercive force of 500 Oe and a saturation magnetization of 80 emu/g. Said suitable combination of additives is in the range consisting essentially, in weight percent, of 61.80 to 56.43 percent of chromium, 0.10 to 5.00 percent of sulfur and 0.05 to 5.00 percent of further additives selected from tellurium, tin and antimony. The following examples are illustrative of preferred embodiments of the invention and do not limit the scope thereof.

EXAMPLE 1

Five grams of chromium trioxide and 0.0042 to 0.4670g of sulfur powder are mixed uniformly so as to have compositions of the additives listed in Table 1. Each of mixtures is put into a platinum crucible to which is added 1 milliliter of water. The mixture in the crucible is placed into an autoclave having the inner volume of 40 milliliters. The autoclave is closed and is inserted on an electric furnace of 30 cm diameter. The autoclave is also connected, through a high pressure tube of stainless steel, to a high pressure controlling system comprising a pressure gauge, a pressure head for an automatic recording apparatus and a leak bulb.

The oxygen is introduced into the autoclave up to a pressure of 80 kg/cm² at room temperature. The autoclave is heated at a rate of 100°C per hour to a temperature of 350°C and is maintained at that temperature for 2 hours. The inner pressure of the autoclave at 350°C is about 320 kg/cm². After heating, the autoclave is slowly cooled to room temperature. The pressure is then released. The reaction product is removed from the autoclave and is rinsed with distilled water. The product is a black and magnetic powder which is dried at a temperature below 150°C. Table 1 shows magnetic properties of the obtained powders as functions of added amounts of sulfur.

Table 1

| S(mol %) | Magnetic properties of chromium oxide powders modified by sulfur. | |
|---|---|---|
| | Tc(°C) | $\sigma_s$(emu/g) |
| 0.13 | 114 | 92 |
| 0.26 | 111 | 88 |
| 1.24 | 110 | 80 |
| 2.58 | 97 | 74 |
| 7.51 | 87 | 71 |
| 12.15 | 80 | 69 |

EXAMPLE 2

Five grams of chromium trioxide, 0.0578g of telluric acid and 0.0085g of meta-stannic acid and 0.008g to 0.121g of sulfur are mixed uniformly so as to have compositions listed in Table 2. Each of mixtures is processed in similar manner as described in Example 1.

The obtained chromium oxide powders have magnetic properties listed in Table 2.

Table 2

| | Magnetic properties of chromium oxide modified by sulfur, telluric acid and meta-stannic acid. | | | | |
|---|---|---|---|---|---|
| S(mol %) | $H_6TeO_6$(mol%) | $H_2SnO_3$(mol%) | Tc(°C) | Hc(Oe) | $\sigma_s$(emu/g) |
| 0.5 | 0.5 | 0.1 | 113 | 390 | 83 |
| 1 | 0.5 | 0.1 | 103.5 | 320 | 75 |
| 3 | 0.5 | 0.1 | 99 | 370 | 74 |
| 5 | 0.5 | 0.1 | 98 | 280 | 74 |
| 7 | 0.5 | 0.1 | 98 | 260 | 71 |

EXAMPLE 3

Five grams of chromium trioxide, 0.0096g to 0.5050g of TeS$_2$ and 0g to 0.4815g of SnS$_2$ are mixed uniformly so as to have compositions listed in Table 3. Each of mixtures is treated in similar way as in Example 1.

The obtained powders have magnetic properties listed in Table 3.

Table 3

| Magnetic properties of chromium oxide modified by tellurium sulfide and tin sulfide. | | | | |
|---|---|---|---|---|
| TeS$_2$(mol%) | SnS$_2$(mol%) | Tc(°C) | Hc(Oe) | $\sigma_s$(emu/g) |
| 1 | 0.1 | 103 | 265 | 80 |
| 1 | 0.5 | 100 | 270 | 76 |
| 1 | 1 | 98.5 | 280 | 73 |
| 1 | 3 | 95 | 280 | 65 |
| 1 | 5 | 94 | 280 | 70 |
| 0.5 | 1 | 102 | 360 | 79 |

EXAMPLE 4

Five grams of chromium trioxide, 0.0085g to 0.2627g of Sb$_2$S$_3$ are mixed and treated in a similar way as described in Example 1. The obtained powders have magnetic properties listed in Table 4.

Table 4

| Magnetic properties of chromium oxide modified by antimony sulfide | | | |
|---|---|---|---|
| Sb$_2$S$_3$(mol%) | Tc(°C) | Hc(Oe) | $\sigma_s$(emu/g) |
| 0.05 | 114 | 280 | 92 |
| 0.25 | 111 | 320 | 83 |
| 0.50 | 103 | 280 | 78 |
| 1.52 | 99 | 205 | 62 |

EXAMPLE 5

The mixture of chromium trioxide, 0.5 to 1.5 mol percent of TeS$_2$, 0 to 1 mol percent of H$_6$TeO$_6$, 0 to 1 mol percent of SnS$_2$ and 0 to 0.3 mol percent of H$_2$SnO$_3$ are prepared and treated in a similar way as described in Example 1. In this treatment, instead of platinum crucible, a container made of glass is used.

The obtained powders have magnetic properties listed in Table 5.

Table 5

| Magnetic properties of chromium oxide modified by compounds selected from the group of tellurium sulfide, telluric acid, tin sulfide and stannic acid. | | | | | | |
|---|---|---|---|---|---|---|
| TeS$_2$(mol%) | H$_6$TeO$_6$(mol%) | SnS$_2$(mol%) | H$_2$SnO$_3$(mol%) | Tc(°C) | Hc(Oe) | $\sigma_s$(emu/g) |
| 1.2 | 0 | 0.3 | 0 | 99 | 350 | 78 |
| 0 | 0.5 | 1.0 | 0 | 95 | 375 | 82 |
| 0 | 1.0 | 1.0 | 0 | 104 | 400 | 77 |
| 1.5 | 0 | 0 | 0.1 | 107 | 450 | 77 |
| 1.5 | 0 | 0 | 0.3 | 104 | 410 | 75 |

EXAMPLE 6

The mixture of chromium trioxide, antimony sulfide and tin sulfide are prepared and treated in similar way as described in Example 1. The obtained powders have magnetic properties listed in Table 6.

Table 6

| Magnetic properties of chromium oxide modified by antimony sulfide and tin sulfide | | | | |
|---|---|---|---|---|
| Sb$_2$S$_3$(mol%) | SnS$_2$(mol%) | Tc(°C) | Hc(Oe) | $\sigma_s$(emu/g) |
| 0.25 | 0.1 | 105 | 390 | 82 |
| 0.25 | 0.5 | 100 | 400 | 79 |
| 0.25 | 1.0 | 97 | 400 | 77 |

We claim:

1. A method for making a ferromagnetic chromium oxide powder consisting essentially of
   61.84 to 53.08 weight percent of chromium
   0.05 to 5.00 weight percent of sulfur
   0.10 to 10.00 weight percent of tellurium,
   said method comprising: heating a powdered mixture consisting essentially of CrO$_3$ and TeS$_2$ in amounts to effect said chromium oxide under a pressure of oxygen or oxygen and water vapor of 50 to 1000 atmospheres at a temperature of 250° to 480°C.

2. A method for making a ferromagnetic chromium oxide powder according to claim 1, wherein said mixture is placed into a crucible made of a material selected from the group consisting of glass, ceramics and platinum metal.

3. A method for making a ferromagnetic chromium oxide powder comprising heating a powdered mixture consisting essentially of CrO$_3$ and sulfur in a ratio of 5 weight parts of CrO$_3$ to 0.0042 to 0.4670 weight parts of sulfur; under a pressure of 50 to 1000 atmospheres at a temperature of 250° to 480°C.

4. A method for making a ferromagnetic chromium oxide powder comprising heating a powdered mixture consisting essentially of of CrO$_3$ and TeS$_2$ in a ratio of 5 weight parts of CrO$_3$ to 0.0096 to 0.5050 weight parts of TeS$_2$ under a pressure of 50 to 1000 atmospheres at a temperature of 250° to 480°C.

* * * * *